United States Patent
Argust

(10) Patent No.: US 7,024,379 B2
(45) Date of Patent: Apr. 4, 2006

(54) REAL TIME PUSH OF PRODUCT AVAILABILITY INFORMATION

(75) Inventor: David D. Argust, Kingston, NY (US)

(73) Assignee: International Business Machines Corporation, Armonk, NY (US)

( * ) Notice: Subject to any disclaimer, the term of this patent is extended or adjusted under 35 U.S.C. 154(b) by 614 days.

(21) Appl. No.: 09/897,890

(22) Filed: Jul. 5, 2001

(65) Prior Publication Data

US 2003/0009387 A1 Jan. 9, 2003

(51) Int. Cl.
*G06F 17/60* (2006.01)
(52) U.S. Cl. ...................................... 705/26
(58) Field of Classification Search ............... 705/26, 705/27
See application file for complete search history.

(56) References Cited

U.S. PATENT DOCUMENTS

| | | | |
|---|---|---|---|
| 4,984,155 A | | 1/1991 | Geier et al. |
| 5,231,567 A | * | 7/1993 | Matoba et al. ............... 700/100 |
| 5,819,232 A | | 10/1998 | Shipman |
| 6,029,142 A | | 2/2000 | Hill |
| 6,032,130 A | | 2/2000 | Alloul et al. |
| 6,055,519 A | | 4/2000 | Kennedy et al. |
| 6,757,689 B1 | * | 6/2004 | Battas et al. ................ 707/101 |
| 2001/0049634 A1 | * | 12/2001 | Stewart ......................... 705/26 |
| 2002/0138316 A1 | * | 9/2002 | Katz et al. ..................... 705/7 |
| 2002/0161674 A1 | * | 10/2002 | Scheer ......................... 705/28 |

FOREIGN PATENT DOCUMENTS

JP 02001265981 * 9/2001

OTHER PUBLICATIONS

Barry, Curt, "Running on empty", Catalog age, Jul. 1994.*
Gardner et al, "More distributors set up shop on the World Wide Web", EDN, Boston, dated Aug. 15, 1997.*

* cited by examiner

*Primary Examiner*—Mark Fadok
(74) *Attorney, Agent, or Firm*—Gibb I.P. Law Firm, LLC; Derek S. Jennings

(57) ABSTRACT

A method of pushing changes in product shipment dates to a catalog that sends an original availability date for products to the catalog and maintains a capacity scheduling system that utilizes a series of capacity buckets to represent the product shipment dates. Each capacity bucket represents an additional shipment delay period. As orders for the product are placed resulting in decreasing quantities in the capacity buckets, the invention detects that the level in the capacity buckets has become less than an established threshold. In addition, the method sends a push signal to the catalog when this detection takes place. Conversely, if the capacity buckets are increased in value as a result of increased manufacturing capability and the quantity in a bucket increases above the threshold, this fact is also pushed out to the catalog.

15 Claims, 2 Drawing Sheets

REAL TIME PUSH OF PRODUCT AVAILABILITY INFORMATION

BACKGROUND OF THE INVENTION

1. Field of the Invention

The present invention generally relates to online catalog product availability updating systems and more particularly to an improved online catalog product availability updating system that pushes an availability date to the online catalog depending upon the status of capacity buckets in a scheduling application.

2. Description of the Related Art

In an e-business environment it is critical to provide customers with accurate, timely and up to date information on the "availability" of products they may choose to order. Products are often sold through electronic on-line catalogs over public and private networks. For example, it is common for a manufacturer or sales organization to provide an on-line catalog over the Internet. Additionally, salespeople often quote price and shipment times based upon on-line electronic catalogs they maintain on private networks. These on-line catalogs usually include an anticipated availability date that is updated periodically. In this context, "availability" means when that product would be able to be shipped to the customer if ordered right now. By its very nature, this "availability" information is time sensitive and can change from moment to moment based upon available supply and order placement activity.

Currently availability dates are scheduled with the use of a "scheduling application." Product availability information is obtained by doing "extracts" from the scheduling application databases to create a list of product availability for all products. When automated, these extracts are typically performed by overnight batch runs that take the results and populate on-line catalogs that are viewable by the customer on the Internet. For on-line catalogs that may contain thousands or tens of thousands of items, only a small percentage are likely to change from one day to another. So for most products, the availability is accurate for the customer. However, for the items that do have changes in availability, the information provided to the customer is incorrect, leading to customer dissatisfaction.

Conventional systems for updating the projected shipment date in on-line catalogs center around increased data extraction from the "scheduling application." For example, the catalog may sample the scheduling application database periodically. To increase performance, the frequency of extracts is increased from say, once a day, to once a shift, or once an hour, etc. Another alternative is to perform an individual extract from the scheduling application database for each given product as it is displayed in the catalog. However, the increased traffic of these alternatives make them undesirable.

Therefore, there is a need for system that updates the anticipated shipment time of products within on-line catalogs only when the shipment time changes. The invention described below provides a method and system that only updates the on-line catalog when the anticipated shipment date changes.

SUMMARY OF THE INVENTION

In view of the foregoing and other problems, disadvantages, and drawbacks of the conventional online catalog product availability updating systems the present invention has been devised, and it is an object of the present invention to provide a structure and method for an improved online catalog product availability updating system.

In order to attain the object(s) suggested above, there is provided, according to one aspect of the invention a method of pushing changes in product shipment dates to a catalog that sends an original availability date for products to the catalog. This is applicable for a scheduling application that conceptually maintains a capacity utilizing a series of capacity buckets to represent the product shipment dates. Each capacity bucket represents an additional shipment delay period. The invention decreases quantities in the capacity buckets as orders for the products are placed and increases quantities in the buckets as products are manufactured. In addition, the method sends a push signal to the catalog when a capacity bucket of a product reaches a specified level.

The push signal includes a revised availability date for the product in the catalog that is different than the original availability date by the shipment delay period. The timing of when the push signal is sent to the catalog is dependent only upon the quantities in the capacity buckets and is not sent periodically as is done conventionally.

In addition, a system for updating an online catalog includes a scheduling application having a connection to a network, and a catalog connected to the scheduling application via the network. The scheduling application includes at least one series of capacity buckets relating to at least one product and the scheduling application reduces a quantity in the capacity buckets as orders are placed for the product by users through the network. As each capacity bucket in the series of capacity buckets reaches a specified level, the scheduling application updates the catalog to change a published shipment date for the product.

Each capacity bucket represents an additional shipment delay period for the product. When the scheduling application updates the catalog to change the published shipment date, the published shipment date is incremented by the additional shipment delay period. Again, the timing of when the scheduling application updates the published shipment date in the catalog is dependent only upon the quantity in the capacity bucket. The catalog comprises an online catalog connected to the capacity scheduling application via the network. The quantities in the capacity buckets in the scheduling application are increased when the committed manufacturing capabilities are increased. This depends upon the supply demand process used for scheduling. In addition, the quantities in the capacity buckets are increased when previous orders are canceled. The scheduling algorithm used by the scheduling application determines which capacity bucket is used for decrementing as orders are scheduled. This usually depends upon the date requested by the customer for shipment. This date is not always as soon as possible.

With the inventive real-time push of product availability information, when the earliest date capacity bucket is emptied, a push signal is generated with the new earliest date capacity bucket to update the on-line catalog with the new product availability information.

The advantage of the push of product availability design is two-fold. First, the information is updated on a more timely basis. Second, the amount of data transmitted between the on-line catalog and the scheduling application is reduced. With the invention, data is only transmitted when changes occur. To the contrary, with conventional systems, with the nightly extract, all data must be extracted to determine what data has changed.

BRIEF DESCRIPTION OF THE DRAWINGS

The foregoing and other objects, aspects and advantages will be better understood from the following detailed description of a preferred embodiment(s) of the invention with reference to the drawings, in which.

DETAILED DESCRIPTION OF PREFERRED EMBODIMENTS OF THE INVENTION

The invention provides real-time push of current shipment date information from a "scheduling application" to reflect changes from moment to moment as they occur. The invention relates to "capacity scheduling" where a series of "capacity buckets" are maintained for that product for each "scheduling period." Scheduling periods are typically days or weeks. With scheduling application, as customer orders come in with a requested delivery date, they consume capacity out of a capacity bucket to either meet, or come as close as possible to meeting the customers requested delivery. As more and more orders consume capacity and buckets become empty, the delivery dates move further and further out in time.

With the inventive real-time push of product availability information, when the earliest date capacity bucket is emptied a push signal is generated with the new earliest date capacity bucket to update the on-line catalog with the new product availability information. Variations are possible to generate push signals prior to the bucket being completely emptied.

The advantage of the push of product availability design is two-fold. First, the information is updated on a more timely basis. Second, the amount of data transmitted between the on-line catalog and the scheduling application is reduced. With the invention, data is only transmitted when changes occur. To the contrary, with conventional systems, with the nightly extract, all data must be extracted to determine what data has changed.

Figure 1:
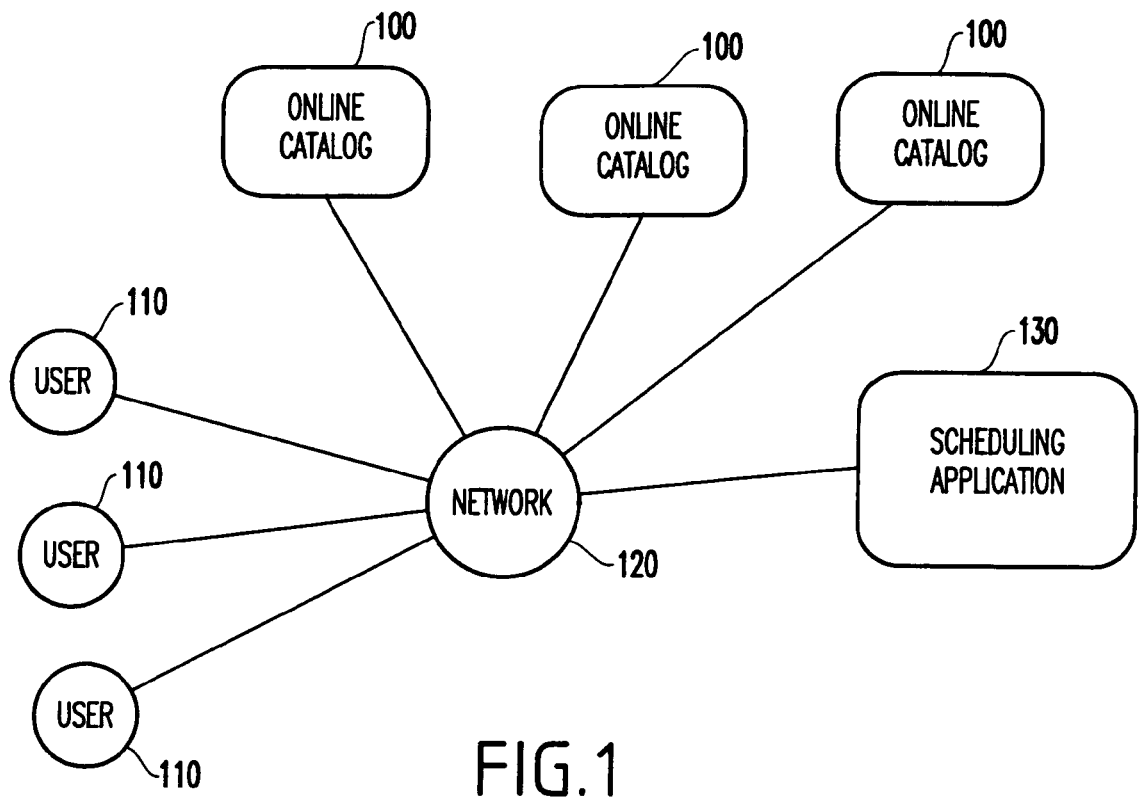
FIG. 1 is a schematic diagram of a system embodiment of the invention.

Referring now to FIG. 1, a system embodiment of the invention is illustrated. The on-line catalogs are shown as item 100, the network is shown as item 120, and users of the network are shown as items 110. The on-line catalog system could take on many representations. For example, the on-line catalog could be an electronic catalog accessible from the Internet and preferably displays product availability information, product configurations, etc. Further, the network could be any internal or external network such as the Internet or and internal network within a single corporation/family. The scheduling application is shown as item 130. The scheduling application could be connected to the on-line catalogs 100 through the network 120 or could be directly connected in an independent server/client relationship.

Figure 2:
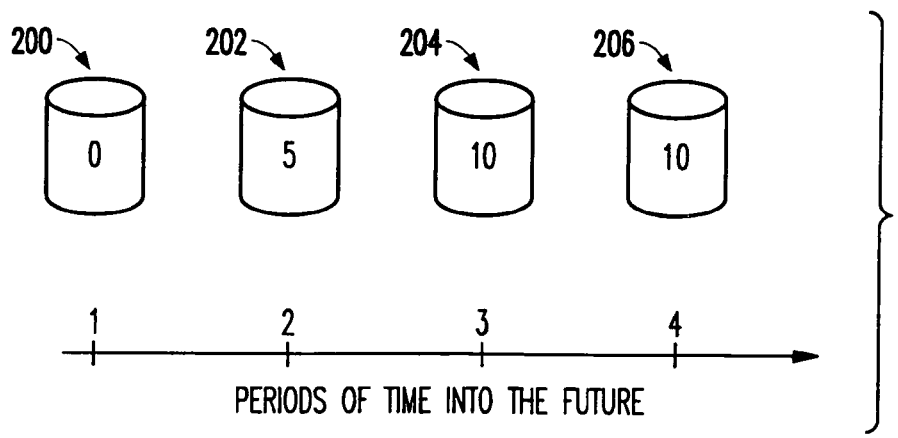
FIG. 2 is a schematic diagram of the capacity buckets maintained in the scheduling application in FIG. 1.

FIG. 2 illustrates capacity buckets 200, 202, 204, and 206. As shown by the time line in FIG. 2, each bucket represents a period of time in the future. The capacity bucket concept as used herein is merely exemplary and could be similarly represented as any forecasting tool such as capacity slots, availability slots, forecast periods, etc.

The scheduling application 130 monitors the status of the capacity buckets. The on-line catalogs 100 are provided with an initial shipment date or the catalogs 100 may indicate immediate availability. As customer orders are placed, capacity is removed from the capacity buckets. As shown in FIG. 2, the first capacity bucket 200 is empty. The next capacity bucket 202 has a remaining quantity of 5. The remaining quantity buckets 204, 206 have a quantity of 10, which in this example represents a full bucket.

Using this example, current orders would be withdrawn from the capacity bucket 202 and the anticipated shipment date as would be period of time number 2 along the timeline. The timeline can be any time period such as hours, days, weeks, months, years, etc. Assuming the timeline indicates weeks, the estimated shipment date, in this example, would be two weeks. As capacity bucket 202 becomes empty, capacity would be next withdrawn from capacity bucket 204 and the estimated shipment date would be changed to three weeks.

An important feature of the invention is that the on-line catalogs 100 are only updated by the scheduling application 130 through the network 120 when it is necessary to change the estimated shipment date. Otherwise, with the invention the on-line catalogs 100 are not regularly updated, as is done conventionally. Therefore, as capacity bucket 200 becomes empty, the scheduling application pushes a signal to all the on-line catalogs 100 that maintain the product for which the capacity buckets monitor availability. Each different product would have its own series of capacity buckets. This push signal provides a specific shipment date information (or other similar information) to the online catalog that the date had changed from one week in the future to two weeks in the future. In addition to a revised shipping date, the invention can also push other pertinent information to keep the on-line catalog up to date. For example, the lead-time or lead-time range can be changed. In addition, as features or product descriptions change, as well when the temporary or permanent nature of a product's availability changes, the invention can automatically update the on-line catalog. Therefore, the invention is not limited only to pushing availability dates, but instead is equally applicable to pushing all product information that may change on a periodic or non-periodic basis. Similarly, when capacity bucket 202 becomes empty, another push signal will be generated by the scheduling application 130 over the network 120 to the online catalogs 100 indicating that the shipment date for the product in question is currently three weeks. Therefore, the users 110 who view the on-line catalog 100 through the network 120 will be provided with current estimated shipment times.

As the supply demand process determines additional manufacturing capability, the capacity buckets are refilled. If the supply demand process increased the manufacturing capability in a bucket that had become empty, the invention similarly sends a push signal again revising the shipment date. For example, in FIG. 2, bucket 200 is empty. If a supply demand update has determined that 5 additional items can be shipped in the time period associated with bucket 200, and increases the quantity in that bucket, then orders can be filled from this bucket. This represents an earlier shipment date (i.e. one week) and this fact must be pushed out to revise the shipment dates in the catalog. This same push of an earlier shipment date is needed if for any reason the quantity in the near in capacity bucket increases above the threshold. Another reason for this could be the cancellation of previous orders. In addition, as mentioned above, a different level other than empty can be utilized to initiate the push signal. Therefore, a certain amount of time delay can be built into the system by sending the push signal when the bucket is nearly empty (e.g. 5–10%).

Figure 3:
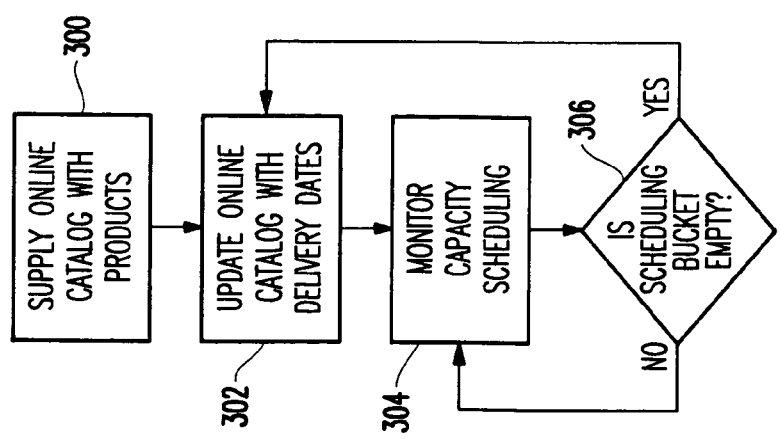
FIG. 3 is a flow diagram illustrating a preferred method of the invention.

FIG. 3 illustrates the invention in flowchart form. More specifically, in item 300, the scheduling application 130 initially supplies the on-line catalogs 100 with product information. In item 302, the scheduling application 130 provides the on-line catalogs 100 with shipment dates. For example, a default shipment date could be immediate shipment. In item 304, the scheduling application 130 monitors the capacity and scheduling using the capacity buckets. In item 306, the scheduling application 130 checks to see whether a bucket has become empty. If a bucket has become empty, the invention updates the on-line catalogs with new shipment dates in item 302. If the bucket has not become empty, the scheduling application 130 continues to monitor the scheduling buckets, as shown in item 304.

Figure 4:
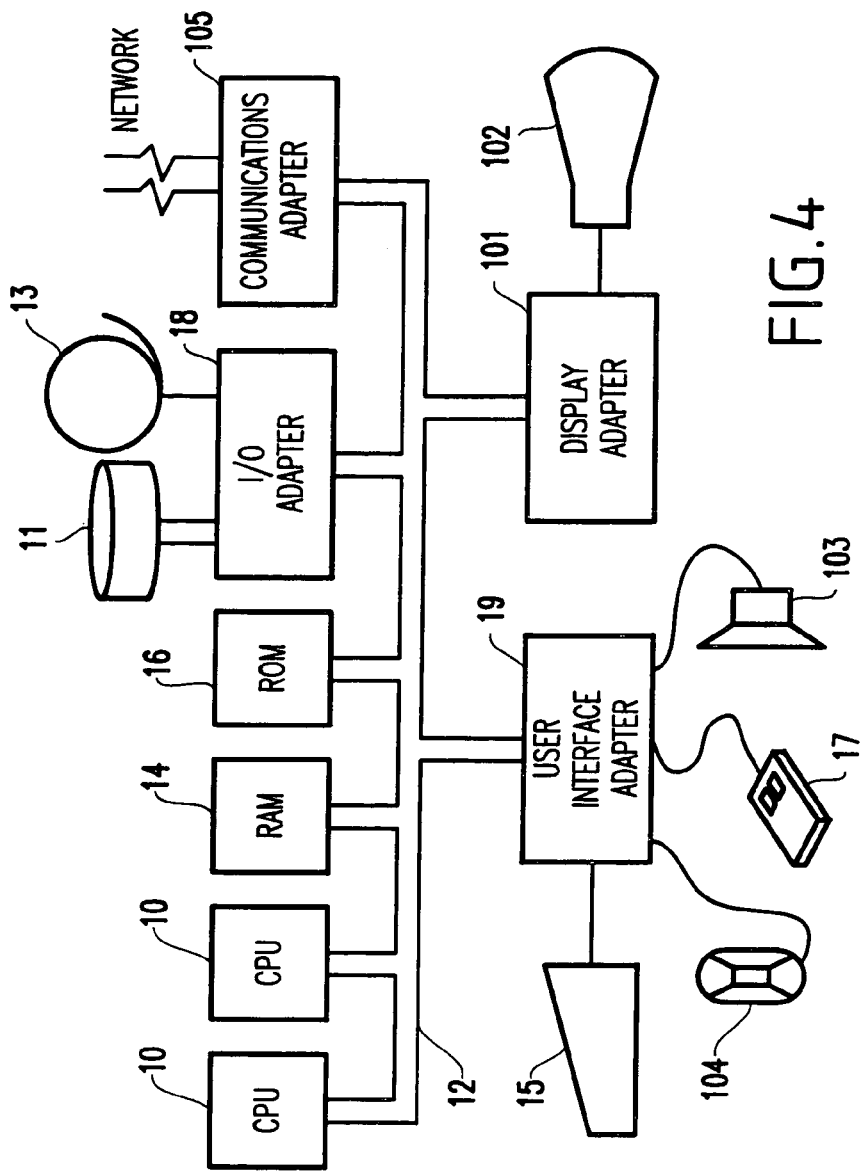
FIG. 4 is a hardware diagram used with the invention.

A representative hardware environment for practicing the present invention is depicted in FIG. 4, which illustrates a typical hardware configuration of an information handling/computer system in accordance with the subject invention, having at least one processor or central processing unit (CPU) 10. CPUs 10 are interconnected via system bus 12 to random access memory (RAM) 14, read-only memory (ROM) 16, an input/output (I/O) adapter 18 for connecting peripheral devices, such as disk units 11 and tape drives 13, to bus 12, user interface adapter 19 for connecting keyboard 15, mouse 17, speaker 103, microphone 104, and/or other user interface devices such as touch screen device (not shown) to bus 12, communication adapter 105 for connecting the information handling system to a data processing network, and display adapter 101 for connecting bus 12 to display device 102. A program storage device readable by the disk or tape units, is used to load the instructions which operate on a wiring interconnect design which is loaded also loaded onto the computer system.

With the inventive real-time push of product availability information, when the earliest date capacity bucket is emptied a push signal is generated with the new earliest date capacity bucket to update the on-line catalog with the new product availability information.

The advantage of the push of product availability design is two-fold. First, the information is updated on a more timely basis. Second, the amount of data transmitted between the on-line catalog and the scheduling application is reduced. With the invention, data is only transmitted when changes occur. To the contrary, with conventional systems, with the nightly extract, all data must be extracted to determine what data has changed.

While the invention has been described in terms of preferred embodiments, those skilled in the art will recognize that the invention can be practiced with modification within the spirit and scope of the appended claims.

What is claimed is:

1. A method of pushing changes in product shipment dates to a catalog comprising:
   sending an original availability date for products to said catalog;
   maintaining a capacity scheduling system that utilizes a series of capacity buckets to represent said product shipment dates, wherein each capacity bucket represents an additional shipment delay period and wherein said maintaining includes decreasing quantities in said capacity buckets as orders for said products are placed; and
   sending a push signal to said catalog when a capacity bucket of a product reaches a specified level
   wherein said push signal includes a revised availability date for said product in said catalog; wherein said revised availability date is different than said original availability date by said shipment delay period; wherein the timing of when said push signal is sent to said catalog is dependent only upon said quantities in said capacity buckets; and wherein said catalog comprises an online catalog connected to said capacity scheduling system via a network.

2. The method in claim 1, wherein said push signal includes a revised availability date for said product in said catalog.

3. The method in claim 2, wherein said revised availability date is different than said original availability date by said shipment delay period.

4. The method in claim 1, wherein the timing of when said push signal is sent to said catalog is dependent only upon said quantities in said capacity buckets.

5. The method in claim 1, wherein said catalog comprises an online catalog connected to said capacity scheduling system via a network.

6. A method of pushing changes in product shipment dates to a catalog comprising:
   sending an original availability date for products to said catalog;
   maintaining a capacity scheduling system that utilizes a series of capacity buckets to represent said product shipment dates, wherein each capacity bucket represents an additional shipment delay period and wherein said maintaining includes decreasing quantities in said capacity buckets as orders for said products are placed and increasing quantities in said capacity buckets as said products are produced; and
   sending a push signal to said catalog when a capacity bucket of a product becomes full and when said capacity bucket of said product becomes empty
   wherein said push signal includes a revised availability date for said product in said catalog; wherein said revised availability date is different than said original availability date by said shipment delay period; wherein the timing of when said push signal is sent to said catalog is dependent only upon said quantities in said capacity buckets; and wherein said catalog comprises an online catalog connected to said capacity scheduling system via a network.

7. The method in claim 6, wherein said push signal includes a revised availability date for said product in said catalog.

8. The method in claim 7, wherein said revised availability date is different than said original availability date by said shipment delay period.

9. The method in claim 6, wherein the timing of when said push signal is sent to said catalog is dependent only upon said quantities in said capacity buckets.

10. The method in claim 6, wherein said catalog comprises an online catalog connected to said capacity scheduling system via a network.

11. A method at pushing changes in product shipment dates to a catalog comprising:
    sending an original availability date for products to said catalog;
    maintaining a capacity scheduling system that utilizes a series of capacity buckets to represent said product shipment dates, wherein each capacity bucket represents an additional shipment delay period and wherein said maintaining includes decreasing quantities in said capacity buckets as orders for said products are placed and increasing quantities in said capacity buckets as said products are produced; and sending a push signal to said catalog only when a capacity bucket of a product comes within a predetermined percentage of full and when said capacity bucket of said product comes within a predetermined percentage of empty wherein said push signal includes a revised availability date for said product in said catalog; wherein said revised availability date is different than said original availability date by said shipment delay period; wherein the timing of when said push signal is sent to said catalog is dependent only upon said quantities in said capacity buckets; and wherein said catalog comprises an online catalog connected to said capacity scheduling system via a network.

12. The method in claim 11, wherein said push signal includes a revised availability date for said product in said catalog.

13. The method in claim 12, wherein said revised availability date is different than said original availability date by said shipment delay period.

14. The method in claim 11, wherein the timing of when said push signal is sent to said catalog is dependent only upon said quantities in said capacity buckets.

15. The method in claim 11, wherein said catalog comprises an online catalog connected to said capacity scheduling system via a network.

* * * * *